US012154712B2

(12) United States Patent
Blow

(10) Patent No.: US 12,154,712 B2
(45) Date of Patent: Nov. 26, 2024

(54) METHOD OF FORMING AN ELECTROMAGNETIC DEVICE

(71) Applicant: VISHAY DALE ELECTRONICS, LLC, Columbus, NE (US)

(72) Inventor: Darek Blow, Yankton, SD (US)

(73) Assignee: VISHAY DALE ELECTRONICS, LLC, Columbus, NE (US)

( * ) Notice: Subject to any disclaimer, the term of this patent is extended or adjusted under 35 U.S.C. 154(b) by 869 days.

(21) Appl. No.: 17/097,886

(22) Filed: Nov. 13, 2020

(65) Prior Publication Data

US 2021/0175002 A1 Jun. 10, 2021

Related U.S. Application Data

(63) Continuation of application No. 13/750,762, filed on Jan. 25, 2013, now Pat. No. 10,840,005.

(51) Int. Cl.

| | |
|---|---|
| ***H01F 7/06*** | (2006.01) |
| ***H01F 27/02*** | (2006.01) |
| ***H01F 27/255*** | (2006.01) |
| ***H01F 41/12*** | (2006.01) |
| *H01F 27/28* | (2006.01) |

(52) U.S. Cl.

CPC ......... *H01F 27/255* (2013.01); *H01F 27/022* (2013.01); *H01F 41/125* (2013.01); *H01F 27/2828* (2013.01)

(58) Field of Classification Search

CPC .. H01F 27/022; H01F 27/255; H01F 27/2828; H01F 41/125

See application file for complete search history.

(56) References Cited

U.S. PATENT DOCUMENTS

| | | | |
|---|---|---|---|
| 2,497,516 | A | 2/1950 | Phelps |
| 2,889,525 | A | 6/1959 | Smith |
| 3,169,234 | A | 2/1965 | Renskers |
| 3,601,735 | A | 8/1971 | Bercovici |
| 3,844,150 | A | 10/1974 | Mees et al. |
| 3,958,328 | A | 5/1976 | Lee |
| 4,180,450 | A | 12/1979 | Morrison |
| 4,223,360 | A | 9/1980 | Sansom et al. |

(Continued)

FOREIGN PATENT DOCUMENTS

| | | | |
|---|---|---|---|
| CN | 1059231 | A | 3/1992 |
| CN | 1567488 | A | 1/2005 |

(Continued)

OTHER PUBLICATIONS

Ferrite (magnet), Wikipedia [retrieved on Feb. 17, 2015] Retrieved from the Internet: http://en.wikipedia.org/wiki/Ferrite_(magnet) 4 pages.

*Primary Examiner* — Paul D Kim
(74) *Attorney, Agent, or Firm* — Volpe Koenig

(57) ABSTRACT

A low profile high current composite transformer is disclosed. Some embodiments of the transformer include a first conductive winding having a first start lead, a first finish lead, a first plurality of winding turns, and a first hollow core; a second conductive winding having a second start lead, a second finish lead, a second plurality of turns, and a second hollow core; and a soft magnetic composite compressed surrounding the first and second windings. The soft magnetic composite with distributed gap provides for a near linear saturation curve.

18 Claims, 14 Drawing Sheets

(56) References Cited

U.S. PATENT DOCUMENTS

| | | | |
|---|---|---|---|
| 4,227,143 | A | 10/1980 | Elders et al. |
| 4,413,161 | A | 11/1983 | Matsumoto et al. |
| 4,613,841 | A | 9/1986 | Roberts |
| 4,663,604 | A | 5/1987 | Vanschaick et al. |
| 4,874,916 | A | 10/1989 | Burke |
| 4,901,048 | A | 2/1990 | Williamson |
| 5,010,314 | A | 4/1991 | Estrov |
| 5,053,738 | A | 10/1991 | Sato |
| 5,126,715 | A | 6/1992 | Yerman et al. |
| 5,451,914 | A | 9/1995 | Stengel |
| 5,481,238 | A | 1/1996 | Carsten et al. |
| 5,592,137 | A | 1/1997 | Levran et al. |
| 5,773,886 | A | 6/1998 | Rostoker et al. |
| 5,801,432 | A | 9/1998 | Rostoker et al. |
| 5,821,624 | A | 10/1998 | Pasch |
| 5,888,848 | A | 3/1999 | Cozar et al. |
| 5,912,609 | A | 6/1999 | Usui et al. |
| 5,913,551 | A | 6/1999 | Tsutsumi et al. |
| 5,917,396 | A | 6/1999 | Halser, III |
| 5,949,321 | A | 9/1999 | Grandmont et al. |
| 6,026,311 | A | 2/2000 | Willemsen Cortes |
| 6,060,974 | A | 5/2000 | Schroter et al. |
| 6,060,976 | A | 5/2000 | Yamaguchi et al. |
| 6,078,502 | A | 6/2000 | Rostoker et al. |
| 6,081,416 | A | 6/2000 | Trinh et al. |
| 6,087,922 | A | 7/2000 | Smith |
| 6,114,932 | A | 9/2000 | Wester |
| 6,204,744 | B1 | 3/2001 | Shafer et al. |
| 6,222,437 | B1 | 4/2001 | Soto et al. |
| 6,317,965 | B1 | 11/2001 | Okamoto et al. |
| 6,351,033 | B1 | 2/2002 | Lotfi et al. |
| 6,392,525 | B1 | 5/2002 | Kato et al. |
| 6,409,859 | B1 | 6/2002 | Chung |
| 6,438,000 | B1 | 8/2002 | Okamoto et al. |
| 6,456,184 | B1 | 9/2002 | Vu et al. |
| 6,460,244 | B1 | 10/2002 | Shafer et al. |
| 6,476,689 | B1 | 11/2002 | Uchida et al. |
| 6,587,025 | B2 * | 7/2003 | Smith ................ H01F 17/0013 336/200 |
| 6,713,162 | B2 | 3/2004 | Takaya et al. |
| 6,734,074 | B2 | 5/2004 | Chen et al. |
| 6,734,775 | B2 | 5/2004 | Chung |
| 6,765,284 | B2 | 7/2004 | Gibson et al. |
| 6,774,757 | B2 | 8/2004 | Fujiyoshi et al. |
| 6,869,238 | B2 | 3/2005 | Ishiguro |
| 6,873,237 | B2 | 3/2005 | Chandrasekaran et al. |
| 6,879,235 | B2 | 4/2005 | Ichikawa |
| 6,879,238 | B2 | 4/2005 | Liu et al. |
| 6,882,261 | B2 | 4/2005 | Moro et al. |
| 6,888,435 | B2 | 5/2005 | Inoue et al. |
| 6,919,788 | B2 | 7/2005 | Holdahl et al. |
| 6,933,895 | B2 | 8/2005 | Mendolia et al. |
| 6,940,154 | B2 | 9/2005 | Pedron et al. |
| 6,965,517 | B2 | 11/2005 | Wanes et al. |
| 6,998,952 | B2 | 2/2006 | Zhou et al. |
| 7,019,608 | B2 | 3/2006 | Darmann |
| 7,023,313 | B2 | 4/2006 | Sutardja |
| 7,034,645 | B2 | 4/2006 | Shafer et al. |
| 7,046,492 | B2 | 5/2006 | Fromm et al. |
| 7,126,443 | B2 | 10/2006 | De Bhailis et al. |
| 7,142,084 | B2 | 11/2006 | Cheng |
| 7,176,506 | B2 | 2/2007 | Beroz et al. |
| 7,192,809 | B2 | 3/2007 | Abbott |
| 7,218,197 | B2 | 5/2007 | Sutardja |
| 7,289,013 | B2 | 10/2007 | Decristofaro et al. |
| 7,289,329 | B2 | 10/2007 | Chen et al. |
| 7,292,128 | B2 | 11/2007 | Hanley |
| 7,294,587 | B2 | 11/2007 | Asahi et al. |
| 7,295,448 | B2 | 11/2007 | Zhu |
| 7,307,502 | B2 | 12/2007 | Sutardja |
| 7,339,451 | B2 | 3/2008 | Liu et al. |
| 7,392,581 | B2 | 7/2008 | Sano |
| 7,425,883 | B2 * | 9/2008 | Matsutani ............ H01F 27/027 336/83 |
| 7,456,722 | B1 | 11/2008 | Eaton et al. |
| 7,460,002 | B2 | 12/2008 | Estrov |
| 7,489,219 | B2 | 2/2009 | Satardja |
| 7,540,747 | B2 | 6/2009 | Ice et al. |
| 7,541,908 | B2 | 6/2009 | Kitahara et al. |
| 7,545,026 | B2 | 6/2009 | Six |
| 7,567,163 | B2 | 7/2009 | Dadafshar et al. |
| 7,629,860 | B2 | 12/2009 | Liu et al. |
| 7,667,565 | B2 | 2/2010 | Liu |
| 7,675,396 | B2 | 3/2010 | Liu et al. |
| 7,705,508 | B2 | 4/2010 | Dooley |
| 7,736,951 | B2 | 6/2010 | Prajuckamol et al. |
| 7,746,209 | B1 | 6/2010 | Li |
| 7,791,445 | B2 | 9/2010 | Manoukian et al. |
| 7,825,502 | B2 | 11/2010 | Irving et al. |
| 7,830,237 | B1 | 11/2010 | Chen |
| 7,849,586 | B2 | 12/2010 | Sutardja |
| 7,868,725 | B2 | 1/2011 | Sutardja |
| 7,872,350 | B2 | 1/2011 | Otremba et al. |
| 7,882,614 | B2 | 2/2011 | Sutardja |
| 7,915,993 | B2 | 3/2011 | Liu et al. |
| 7,920,043 | B2 | 4/2011 | Nakagawa et al. |
| 7,987,580 | B2 | 8/2011 | Sutardja |
| 8,028,401 | B2 | 10/2011 | Sutardja |
| 8,035,471 | B2 | 10/2011 | Sutardja |
| 8,049,588 | B2 | 11/2011 | Shibuya et al. |
| 8,080,865 | B2 | 12/2011 | Harvey |
| 8,093,980 | B2 | 1/2012 | Asou et al. |
| 8,097,934 | B1 | 1/2012 | Li et al. |
| 8,098,123 | B2 | 1/2012 | Sutardja |
| 8,164,408 | B2 | 4/2012 | Kim |
| 8,279,037 | B2 | 10/2012 | Yan et al. |
| 8,310,332 | B2 | 11/2012 | Yan et al. |
| 8,350,659 | B2 | 1/2013 | Dziubek et al. |
| 8,378,777 | B2 | 2/2013 | Yan et al. |
| 8,416,043 | B2 | 4/2013 | Ikriannikov |
| 8,466,764 | B2 | 6/2013 | Bogert et al. |
| 8,484,829 | B2 | 7/2013 | Manoukian et al. |
| 8,659,379 | B2 | 2/2014 | Yan et al. |
| 8,695,209 | B2 | 4/2014 | Saito et al. |
| 8,698,587 | B2 | 4/2014 | Park et al. |
| 8,707,547 | B2 | 4/2014 | Lee |
| 8,910,369 | B2 | 12/2014 | Herbsommer et al. |
| 8,910,373 | B2 | 12/2014 | Yan et al. |
| 8,916,408 | B2 | 12/2014 | Huckabee et al. |
| 8,916,421 | B2 | 12/2014 | Gong et al. |
| 8,927,342 | B2 | 1/2015 | Goesele et al. |
| 8,941,457 | B2 | 1/2015 | Yan et al. |
| 8,952,776 | B2 | 2/2015 | Ikriannikov |
| 8,998,454 | B2 | 4/2015 | Wang et al. |
| 9,001,524 | B1 | 4/2015 | Akre |
| 9,013,259 | B2 | 4/2015 | Ikriannikov |
| 9,029,741 | B2 | 5/2015 | Montoya et al. |
| 9,141,157 | B2 | 9/2015 | Mohd Arshad et al. |
| 9,142,345 | B2 | 9/2015 | Chen et al. |
| 9,177,945 | B2 | 11/2015 | Saye |
| 9,190,389 | B2 | 11/2015 | Meyer-Berg et al. |
| 9,276,339 | B2 | 3/2016 | Rathburn |
| 9,318,251 | B2 | 4/2016 | Klesyk et al. |
| 9,368,423 | B2 | 6/2016 | Do et al. |
| 9,373,567 | B2 | 6/2016 | Tan |
| 2002/0011914 | A1 | 1/2002 | Ikeura et al. |
| 2002/0040077 | A1 | 4/2002 | Hanejko et al. |
| 2002/0130752 | A1 | 9/2002 | Kuroshima |
| 2003/0016112 | A1 | 1/2003 | Brocchi |
| 2003/0178694 | A1 | 9/2003 | Lemaire |
| 2003/0184423 | A1 | 10/2003 | Holdahl |
| 2004/0017276 | A1 | 1/2004 | Chen et al. |
| 2004/0061584 | A1 | 4/2004 | Darmann |
| 2004/0207503 | A1 | 10/2004 | Flanders |
| 2004/0232982 | A1 | 11/2004 | Ichitsubo et al. |
| 2004/0245232 | A1 | 12/2004 | Ihde et al. |
| 2005/0012581 | A1 | 1/2005 | Ono et al. |
| 2005/0030141 | A1 | 2/2005 | Barber |
| 2006/0001517 | A1 | 1/2006 | Cheng |
| 2006/0132272 | A1 | 6/2006 | Kitahara et al. |
| 2007/0052510 | A1 | 3/2007 | Saegusa et al. |
| 2007/0166554 | A1 | 7/2007 | Ruchert et al. |
| 2007/0186407 | A1 | 8/2007 | Shafer et al. |
| 2007/0247268 | A1 | 10/2007 | Oya et al. |

(56) References Cited

U.S. PATENT DOCUMENTS

| | | | |
|---|---|---|---|
| 2007/0257759 | A1 | 11/2007 | Lee et al. |
| 2008/0029879 | A1 | 2/2008 | Tuckerman et al. |
| 2008/0150670 | A1 | 6/2008 | Chung et al. |
| 2008/0211613 | A1 | 9/2008 | Lin |
| 2008/0262584 | A1 | 10/2008 | Bottomley et al. |
| 2008/0303606 | A1 | 12/2008 | Liu et al. |
| 2009/0057822 | A1 | 3/2009 | Wen et al. |
| 2009/0115562 | A1 | 5/2009 | Lee et al. |
| 2009/0289751 | A1 | 11/2009 | Nagano |
| 2010/0007451 | A1 | 1/2010 | Yan |
| 2010/0007453 | A1 | 1/2010 | Yan |
| 2010/0060401 | A1 | 3/2010 | Tai et al. |
| 2010/0123541 | A1 | 5/2010 | Saka et al. |
| 2010/0219926 | A1 | 9/2010 | Willers et al. |
| 2010/0271161 | A1 | 10/2010 | Yan et al. |
| 2010/0314728 | A1 | 12/2010 | Li |
| 2010/0328003 | A1 | 12/2010 | Shibuya et al. |
| 2011/0227690 | A1 | 9/2011 | Watanabe et al. |
| 2011/0260825 | A1 | 10/2011 | Doljack et al. |
| 2011/0273257 | A1 | 11/2011 | Ishizawa |
| 2012/0038444 | A1 | 2/2012 | Wu et al. |
| 2012/0049334 | A1 | 3/2012 | Pagaila et al. |
| 2012/0176214 | A1 | 7/2012 | Hsiao |
| 2012/0216392 | A1 | 8/2012 | Fan |
| 2012/0249279 | A1 | 10/2012 | Itou |
| 2012/0273932 | A1 | 11/2012 | Mao et al. |
| 2013/0015939 | A1 | 1/2013 | Inagaki et al. |
| 2013/0249546 | A1 | 9/2013 | David et al. |
| 2013/0273692 | A1 | 10/2013 | McMillan et al. |
| 2013/0278571 | A1 | 10/2013 | Ahn |
| 2013/0307117 | A1 | 11/2013 | Koduri |
| 2014/0008974 | A1 | 1/2014 | Miyamoto |
| 2014/0210062 | A1 | 7/2014 | Miyazaki |
| 2014/0210584 | A1 | 7/2014 | Blow |
| 2014/0302718 | A1 | 10/2014 | Gailus |
| 2014/0320124 | A1 | 10/2014 | David et al. |
| 2014/0361423 | A1 | 12/2014 | Chi et al. |
| 2015/0214198 | A1 | 7/2015 | Lee et al. |
| 2015/0270860 | A1 | 9/2015 | McCain |
| 2016/0069545 | A1 | 3/2016 | Chien et al. |
| 2016/0099189 | A1 | 4/2016 | Khai Yen et al. |
| 2016/0133373 | A1 | 5/2016 | Orr et al. |
| 2016/0181001 | A1 | 6/2016 | Doljack et al. |
| 2016/0190918 | A1 | 6/2016 | Ho et al. |
| 2016/0217922 | A1 | 7/2016 | Sherrer |

FOREIGN PATENT DOCUMENTS

| | | | |
|---|---|---|---|
| CN | 101578671 | A | 11/2009 |
| CN | 102044327 | A | 5/2011 |
| CN | 102376438 | A | 3/2012 |
| CN | 102822913 | A | 12/2012 |
| CN | 203562273 | U | 4/2014 |
| EP | 191806 | B1 | 8/1986 |
| EP | 0606973 | A1 | 7/1994 |
| EP | 1091369 | A2 | 4/2001 |
| EP | 919064 | B1 | 6/2003 |
| EP | 1933340 | A1 | 6/2008 |
| EP | 2 518 740 | A1 | 10/2012 |
| GB | 1071469 | A | 6/1967 |
| JP | 03-171703 | A | 7/1991 |
| JP | H04-129206 | A | 4/1992 |
| JP | H07-245217 | A | 9/1995 |
| JP | H09-306757 | | 11/1997 |
| JP | H11340060 | A | 12/1999 |
| JP | 2000021656 | A | 1/2000 |
| JP | 2000091133 | A | 3/2000 |
| JP | 2003309024 | A | 10/2003 |
| JP | 2004022814 | A | 1/2004 |
| JP | 2005191403 | A | 7/2005 |
| JP | 2005310812 | A | 11/2005 |
| JP | 2007-317892 | A | 12/2007 |
| JP | 2009224815 | A | 10/2009 |
| TW | M471666 | U | 2/2014 |
| WO | 2010/129352 | A1 | 11/2010 |
| WO | 2011/081713 | A1 | 7/2011 |

* cited by examiner

METHOD OF FORMING AN ELECTROMAGNETIC DEVICE

CROSS REFERENCE TO RELATED APPLICATION(S)

This application is a continuation of U.S. patent application Ser. No. 13/750,762, filed Jan. 25, 2013, now U.S. Pat. No. 10,840,005, the entirety of which is incorporated by reference as if fully set forth herein.

FIELD OF INVENTION

The embodiments of the present invention described herein relate to an improved low profile, high current composite transformer.

BACKGROUND

Transformers, as the name implies, are generally used to convert voltage or current from one level to another. With the acceleration of the use of all different types of electronics in a vast array of applications, the performance requirements of transformers have greatly increased.

There has also been an increase in the types of specialized converters. For example, many different types of DC-to-DC converters exist. Each of these converters has a particular use.

A buck converter is a step-down DC-to-DC converter. That is, in a buck converter the output voltage is less than the input voltage. Buck converters may be used, for example, in charging cell phones in a car using a car charger. In doing so, it is necessary to convert the DC power from the car battery to a lower voltage that can be used to charge the cell phone battery. Buck converters run into problems maintaining the desired output voltage when the input voltage falls below the desired output voltage.

A boost converter is a DC-to-DC converter that generates an output voltage greater than the input voltage. A boost converter may used, for example, within a cell phone to convert the cell phone battery voltage to an increased voltage for operating screen displays and the like. Boost converters run into problems maintaining a higher output voltage when the input voltage fluctuates to a voltage that is greater than the desired output voltage.

Most prior art inductive components, such as inductors and transformers, comprise a magnetic core component having a particular shape, depending upon the application, such as an E, U or I shape, a toroidal shape, or other shapes and configurations. Conductive wire windings are then wound around the magnetic core components to create the inductor or transformer. These types of inductors and transformers require numerous separate parts, including the core, the windings, and a structure to hold the parts together. As a result, there are many air spaces in the inductor which affect its operation and which prevent the maximization of space, and this assembled construction generally causes the component sizes to be larger and reduces efficiency.

Since transformers are being used in a greater array of applications, many of which require small footprints, there is a great need for small transformers that provide superior efficiency.

SUMMARY

A low profile high current composite transformer is disclosed. Some embodiments of the transformer include a first conductive winding having a first start lead, a first finish lead, a first plurality of winding turns, and a first hollow core; a second conductive winding having a second start lead, a second finish lead, a second plurality of turns, and a second hollow core; and a soft magnetic composite compressed surrounding the first and second windings. The soft magnetic composite with distributed gap provides for a near linear saturation curve.

Multiple uses for the transformer are also disclosed. In some embodiments, the transformer operates as a flyback converter, a single-ended primary-inductor converter, and a Cuk converter.

BRIEF DESCRIPTION OF THE DRAWINGS

A more detailed understanding may be had from the following description, given by way of example in conjunction with the accompanying drawings, wherein.

DETAILED DESCRIPTION OF THE DRAWINGS

It is to be understood that the figures and descriptions of the present invention have been simplified to illustrate elements that are relevant for a clear understanding of the present invention, while eliminating, for the purpose of clarity, many other elements found in inductor and transformer designs. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

The invention relates to a low profile high current composite transformer. The transformer includes a first wire winding having a start lead and a finish lead. In addition, the device includes a second wire winding. A magnetic material completely surrounds the wire windings to form an inductor body. Pressure molding is used to mold the magnetic material around the wire windings.

Applications for the present device include, but are not limited to, a Cuk converter, flyback converter, single-ended primary-inductance converter (SEPIC), and coupled inductors. For SEPIC and Cuk converters, the leakage inductance between the two windings of the transformer improves efficiency of the converter by lowering loss with the soft magnetic composite.

Figure 1:
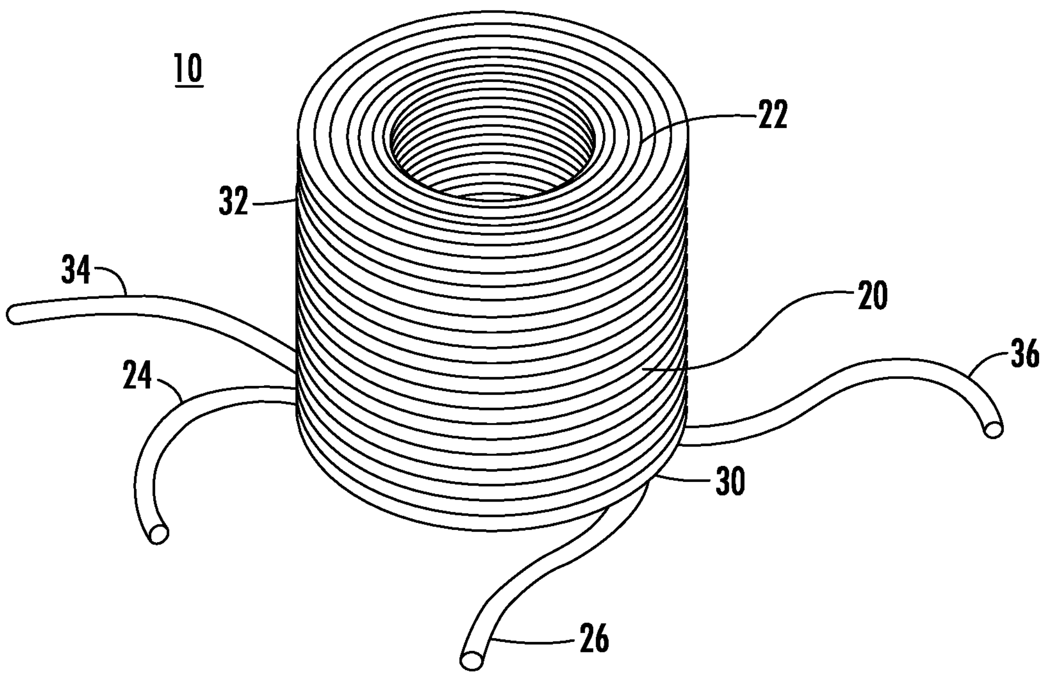
FIG. 1 illustrates the windings of a low profile high current composite transformer.

Referring now to FIG. 1, there is shown the windings of a low profile high current composite transformer 10 that may be used in a converter as described below. A winding, also referred to as a coil in some embodiments, may include one or more turns of an electrical conductor of any shape on a common axis where the inside perimeter or diameter is equal or variable. Each turn may be any shape, including circular, rectangular, and square. The conductor cross-section may be any shape including circular, square or rectangular. Transformer 10 includes two individual windings, a first winding 20 and a second winding 30. First winding 20 includes a plurality of turns 22 and includes a start lead 24 and a finish lead 26. Second winding 30 includes a plurality of turns 32 and includes a start lead 34 and a finish lead 36.

First winding 20 may have any number of turns. Second winding 30 may also have any number of turns. The ratio of the turns of first winding 20 and second winding 30 may be in the range of 1/10 to 10. Specifically, first winding 20 may include a number of turns approximately in the range of 4 to 40, and more specifically approximately 10 turns. Similarly, second winding 30 may include a number of turns approximately in the range of 4 to 40, and more specifically approximately 10 turns.

First winding 20 may be wound in a first direction and second winding 30, while maintaining the same center of rotation, may be wound in the opposite direction. Alternatively, the second winding 30 may be wound in the same direction as the first winding 20, while again maintaining the same center of rotation. Further, second winding 30 may be concurrently wound side-by-side with first winding 20. First winding 20 and second winding 30 may be wound simultaneously in an interleaved winding, which is also known as a bifilar winding. This enables both first winding 20 and second winding 30 to maintain a low profile for the transformer 10. Transformer 10 may be sized with dimensions of 10×10×4 mm or other suitable dimensions that are larger or smaller.

Figure 2:
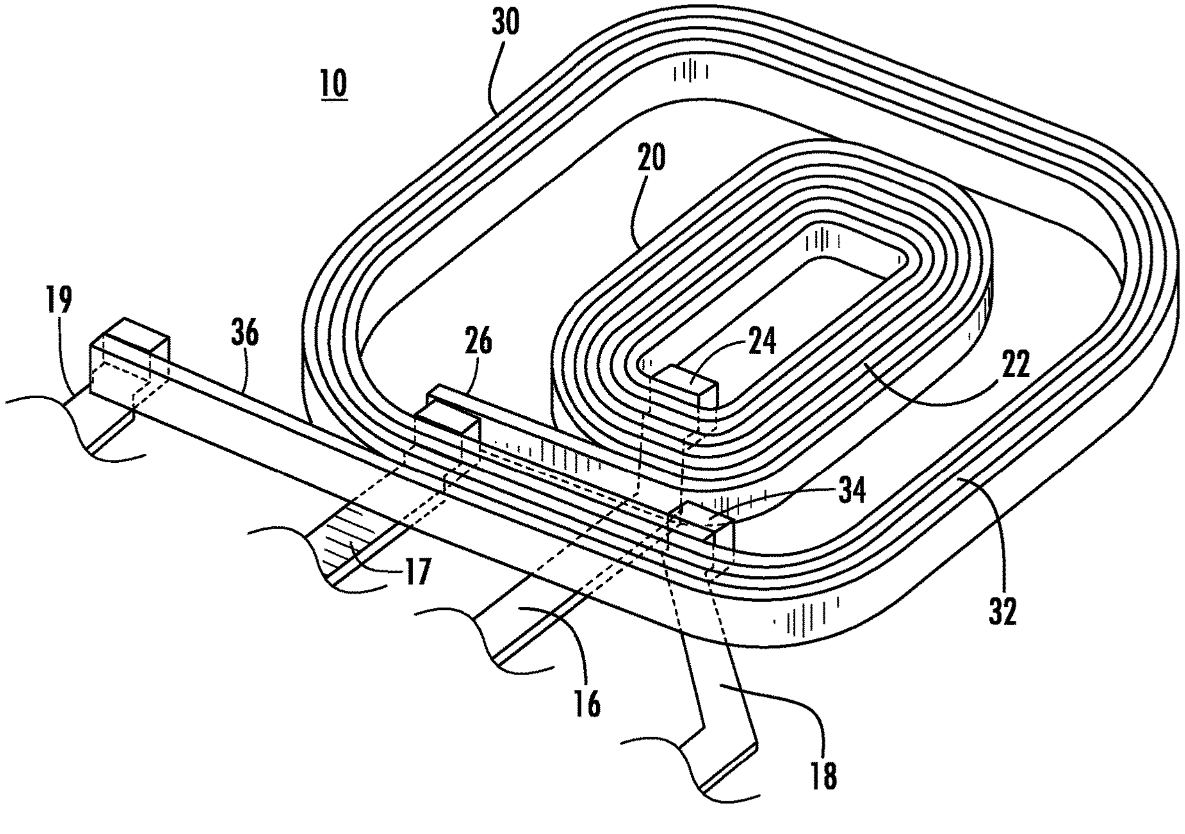
FIG. 2 illustrates an alternate configuration of the windings of a low profile high current composite transformer.

Another configuration for the windings is shown in FIG. 2. This configuration illustrates a flat wire for forming transformer 10. This illustration shows an exaggerated spacing between the first 20 and second windings 30. Transformer 10 includes a wire winding 20, 30 from a flat wire having a rectangular cross section. An example of a wire for windings 20, 30 is an enameled copper flat wire made from copper with a polymide enamel coating for insulation. While a flat wire configuration is shown and described, the present invention can use Litz wire, and/or braided wire configurations as well. Similar to the round configuration above, windings 20, 30 in the flat wire configuration include a plurality of turns 22, 32. First winding 20 includes a start lead 24 and a finish lead 26. Second winding 30 includes a start lead 34 and a finish lead 36. Start lead 24 is interconnected to a first lead 16 and finish lead 26 is interconnected to a second lead 17. Start lead 34 is interconnected to a third lead 18 and finish lead 34 is interconnected to a fourth lead 19.

Figure 3:
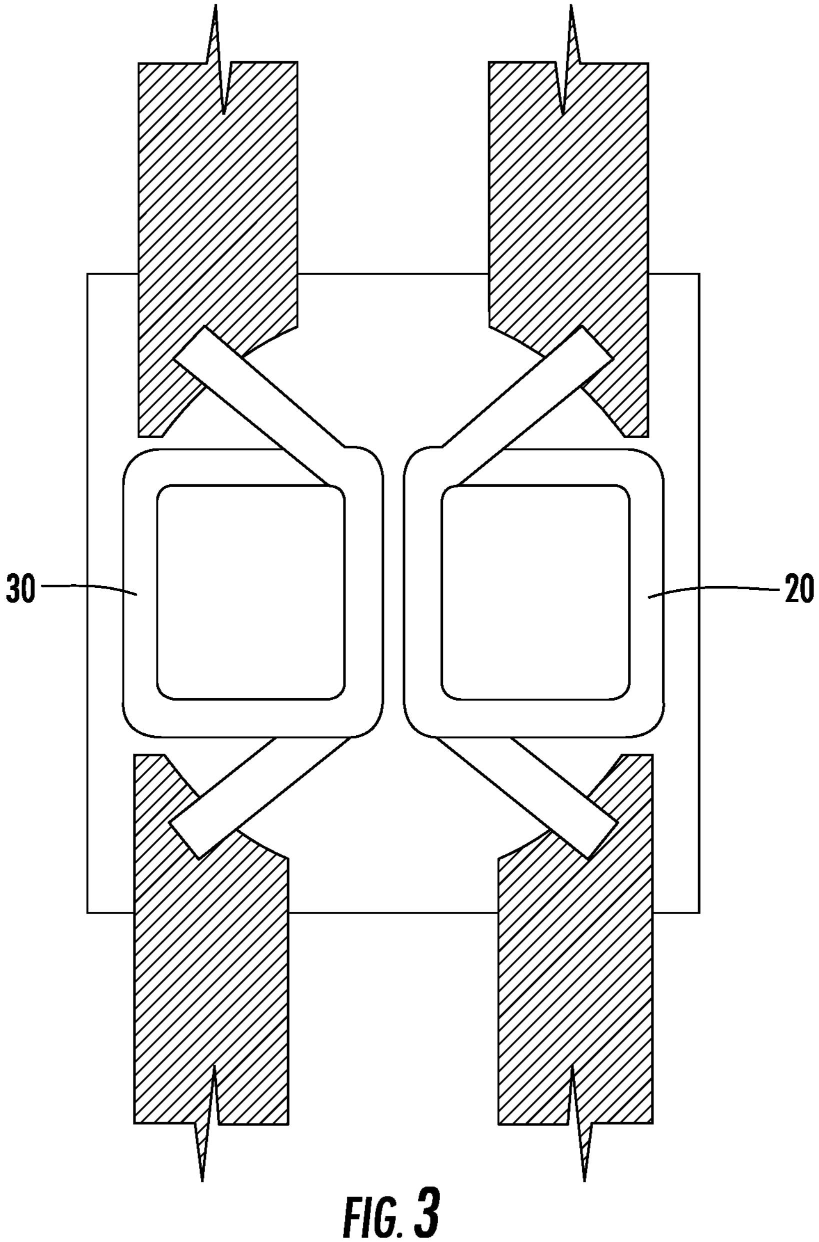
FIG. 3 illustrates an alternate configuration of the windings of a low profile high current composite transformer.

Other configurations of the windings may also be used. For example, as shown in FIG. 3, gapped windings may be used to form transformer 10. In FIG. 3, there are two windings shown, although any number may be used. Gapped windings may include a first winding 20 where the center of winding is displaced laterally from the center of winding of the second winding 30. This displacement may be in the horizontal and/or vertical direction within the confines of the transformer body.

Figure 4:
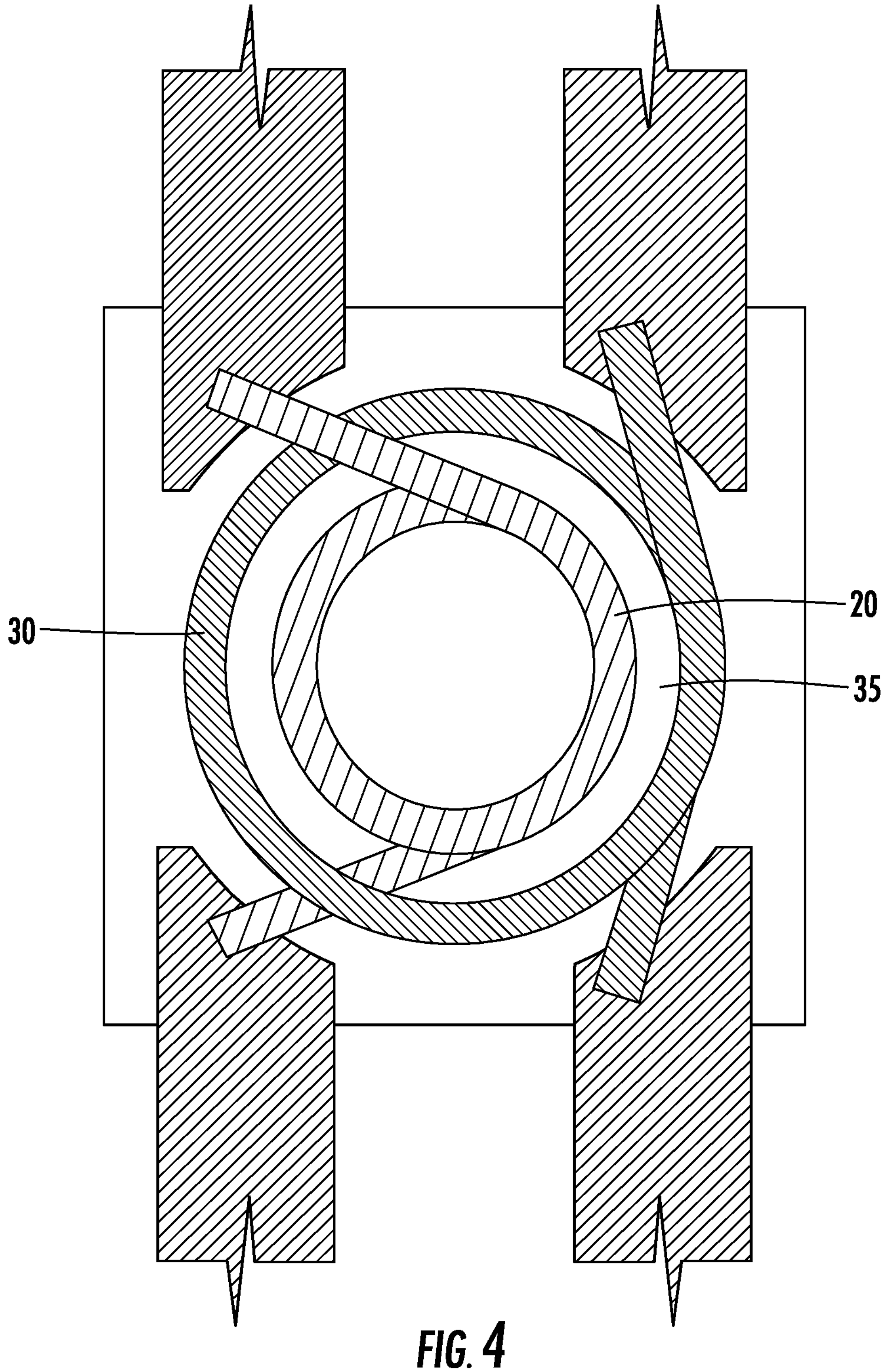
FIGS. 4 and 4A illustrate alternate configurations of the windings of a low profile high current composite transformer.
Figure 4A:
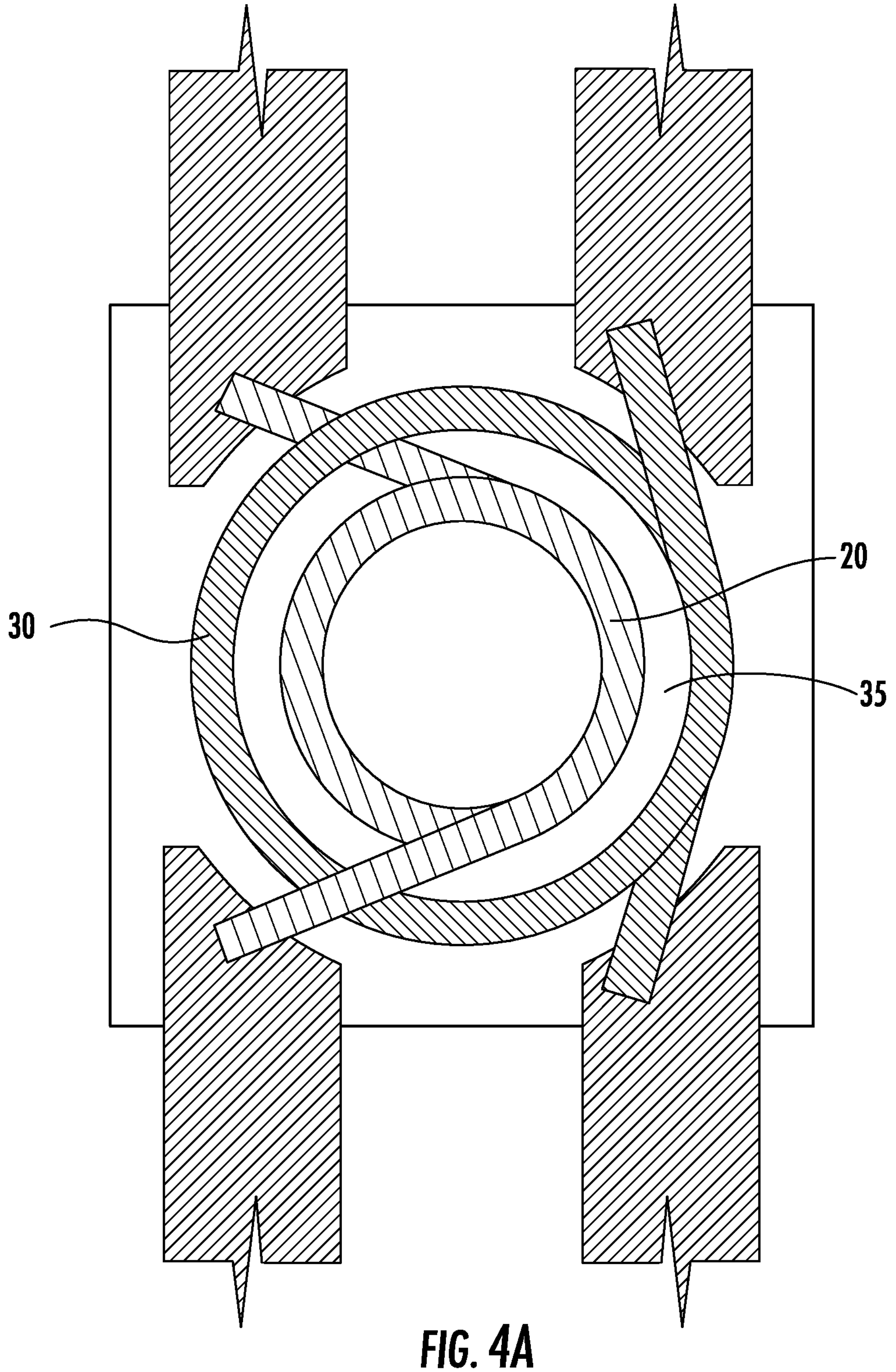

Other configurations of the windings shown in FIGS. 4 and 4A are gapped windings with a shared inner diameter. Again, while showing two windings, any number of windings may be used in this configuration. Gapped windings with a shared inner diameter may include a first winding 20, a second winding 30 with an air gap in between the first winding 20 and second winding 30.

Figure 5:
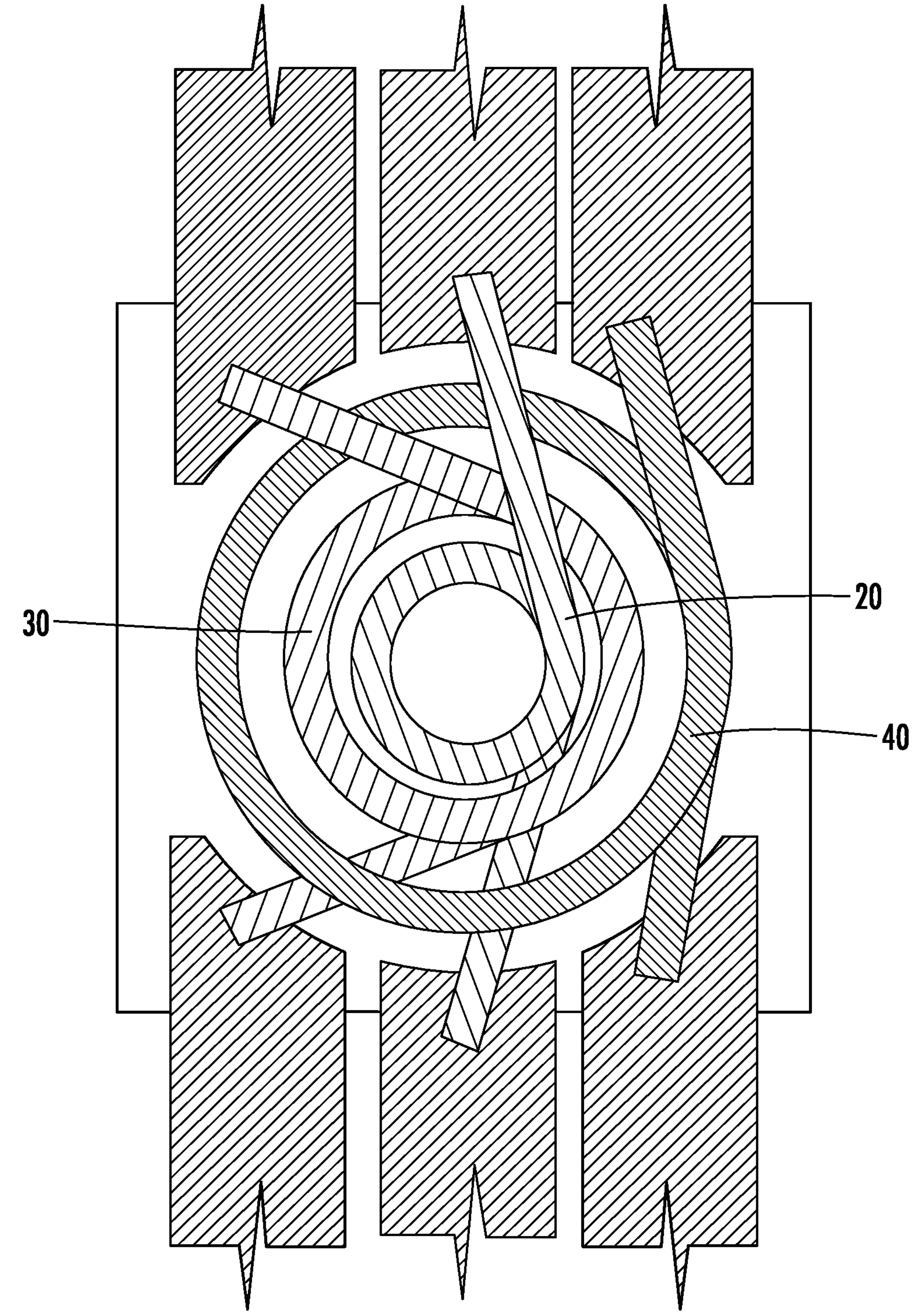
FIG. 5 illustrates an alternate configuration of the windings of a low profile high current composite transformer.

Another configuration of the windings is shown in FIG. 5. This configuration includes three windings. As shown, the first winding 20 is configured with the same center of winding as second winding 30 and third winding 40. Other configurations may be used for a three winding transformer. As shown, first winding is wound about a center of winding, second winding 30 shares the same center of winding and has a larger inner diameter than the outer diameter of first winding 20. Third winding shares the same center of winding and has a larger inner diameter than the outer diameter of second winding 30.

The windings of FIG. 1-5 may have a transformer body formed thereon or around. The transformer body may include a soft magnetic composite comprised of insulated magnetic particles with a distributed gap. The use of the term soft in defining the soft magnetic composite refers to the composite being magnetically soft, such as where the HC, or coercive force, is less than or equal to 5 oersteds. The soft magnetic composite may comprise an alloy powder, an iron powder or a combination of powders. The powder may also include a filler, a resin, and a lubricant. The soft magnetic composite has electrical characteristics that allow the device to have a high inductance, yet low core losses so as to maximize its efficiency.

The soft magnetic composite has high resistivity (exceeding 1 MΩ) that enables the transformer as it is manufactured to perform without a conductive path between the surface mount leads. The magnetic material also allows efficient operation up to 40 MHz depending on the inductance value. The force exerted on the soft magnetic material may be approximately 15 tons per square inch to 60 tons per square inch. This pressure causes the soft magnetic material to be compressed and molded tightly and completely around the windings so as to form the transformer body including in between the windings. Compression and molding tightly and completely around the windings may, in some embodiments, include around and/or in between each turn of the windings.

Figure 6:
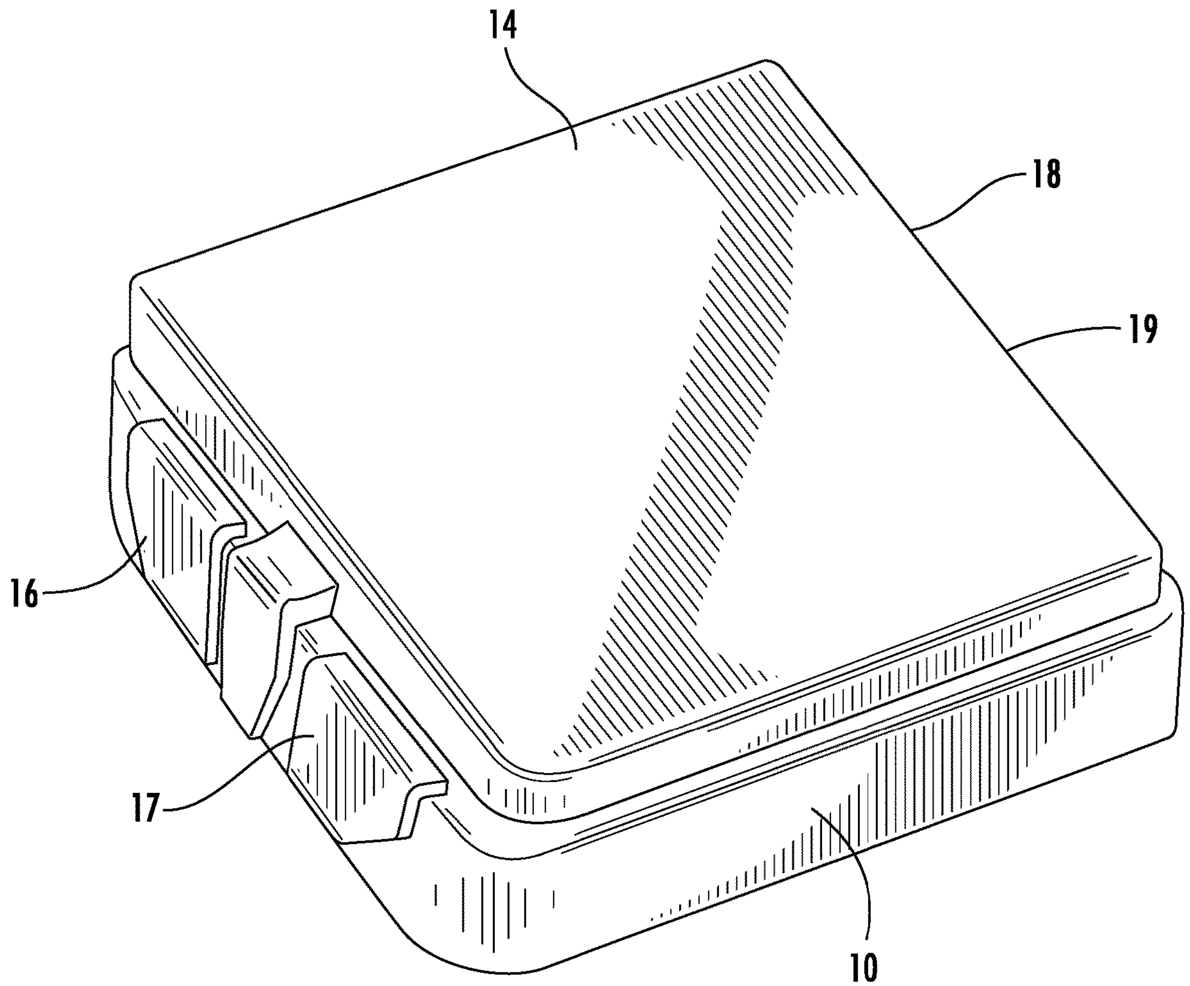
FIG. 6 illustrates a transformer constructed in accordance with some embodiments.

Transformer 10 is shown in FIG. 6 as constructed to be mounted such as on a circuit board (not shown) or for installation with first and second windings 20, 30 formed inside the body 14. Transformer 10 includes a body 14 with a first lead 16 and a second lead 17 extending outwardly therefrom. Body also has a third lead 18 and fourth lead 19 (not visible) extending outwardly therefrom. The leads 16, 17, 18 and 19 are bent and folded under the bottom of body 14 and may be soldered to a pad or pads as needed to connect to a circuit. Once connected to the circuit board, the leads 16, 17, 18 and 19 may be interconnected as desired to enable and affect performance of the transformer 10. In a similar manner, any number of coils or leads may be added as required.

Figure 7:
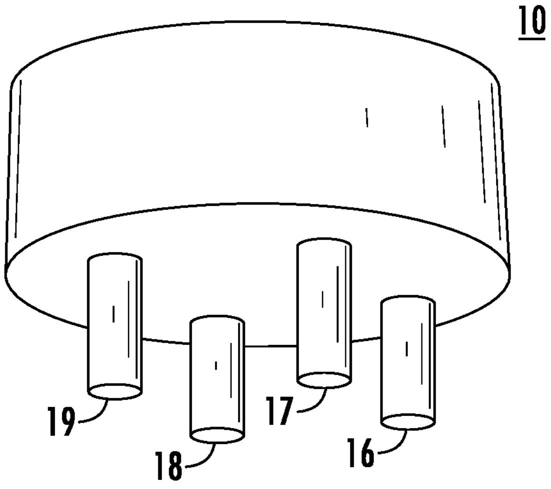
FIG. 7 illustrates a transformer constructed in accordance with some embodiments.

As shown in FIG. 7, transformer 10 includes a two winding configuration to be mounted such as on a circuit board (not shown) or for installation. Transformer 10 includes a body 14 that may be cylindrical as shown or any other shape, such as square or hexagonal, with first and second windings 20, 30 (not visible) formed inside the body 14 and with a first lead 16 and a second lead 17 extending outwardly therefrom. Body also has a third lead 18 and fourth lead 19 extending outwardly therefrom. The leads 16, 17, 18 and 19 extend from the underside of the body and may be soldered to a PCB as needed. Once connected to the circuit board, the leads 16, 17, 18 and 19 may be interconnected as desired to enable and affect performance of the transformer 10.

Figure 8:
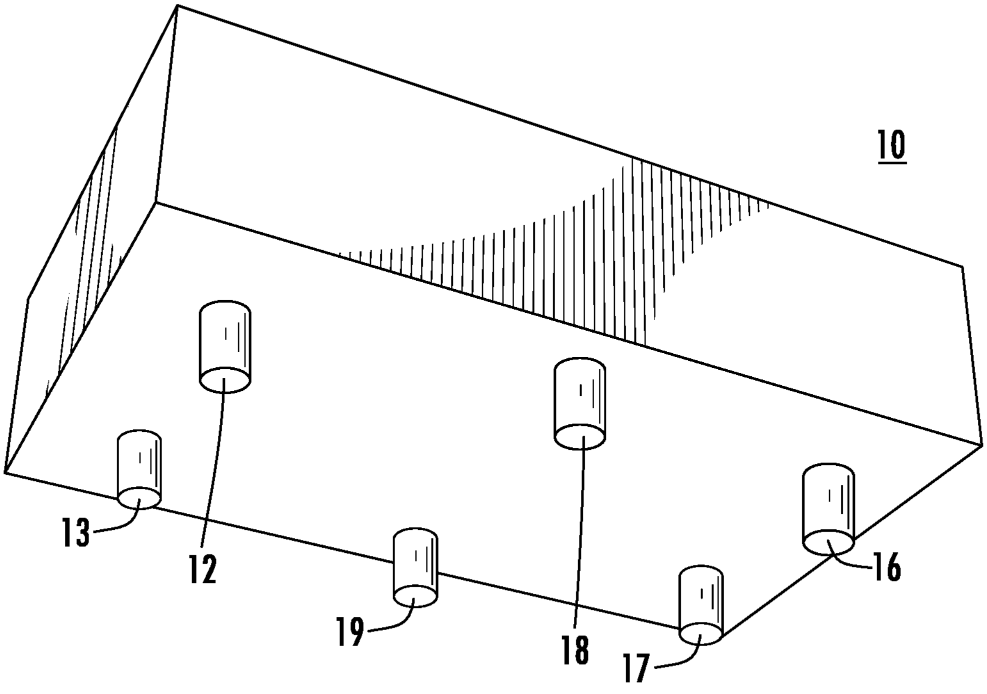
FIG. 8 illustrates a transformer constructed in accordance with some embodiments.

As shown in FIG. 8, transformer 10 includes a three winding configuration to be mounted such as on a circuit board (not shown) or for installation. Transformer 10 includes a body 14 with first and second windings 20, 30 (not visible) formed inside the body 14 and with a first lead 16 and a second lead 17 extending outwardly therefrom. Body also has a third lead 18 and fourth lead 19 extending outwardly therefrom. Body also has a fifth lead 12 and sixth lead 13 extending outwardly therefrom. The leads 12, 13, 16, 17, 18, and 19 extend from the underside of the body and may be soldered to a PCB as needed. Once connected to the circuit board, the leads 12, 13, 16, 17, 18, 19 may be interconnected as desired to enable and affect performance of the transformer 10. In a similar manner, any number of coils or leads may be added as required.

When compared to other inductive components, embodiments of transformer 10 have several unique attributes. The conductive winding, with or without a lead frame, magnetic core material, and protective enclosure are molded as a single integral low profile unitized body that has termination leads suitable for surface or thru hole mounting. The construction allows for maximum utilization of available space for magnetic performance and is magnetically self-shielding. The unitary construction eliminates the need for multiple core bodies, as was the case with prior art E cores or other core shapes, and also eliminates the associated assembly labor. The unique conductor winding of some embodiments allows for high current operation and also optimizes magnetic parameters within the transformer's footprint. The transformer described herein is a low cost, high performance package without the dependence on expensive, tight tolerance core materials and special winding techniques. The pressed powder technology provides a minimum particle size in an insulated ferrous material resulting in low core losses and a high saturation without sacrificing magnetic permeability to achieve a target inductance.

Transformer 10 may realize energy storage as defined in Equation 1.

$$\text{Energy storage} = \tfrac{1}{2} * L * I^2 \quad \text{(Equation 1)}$$

Energy storage is maximized by the selection of the particle composition and size along with the gap created around the particle by the insulation, binder and lubricant. The pressed powder technology provides for superior saturation characteristics which keep the inductance high for the associated applied current to maximize storage energy.

Figure 9:
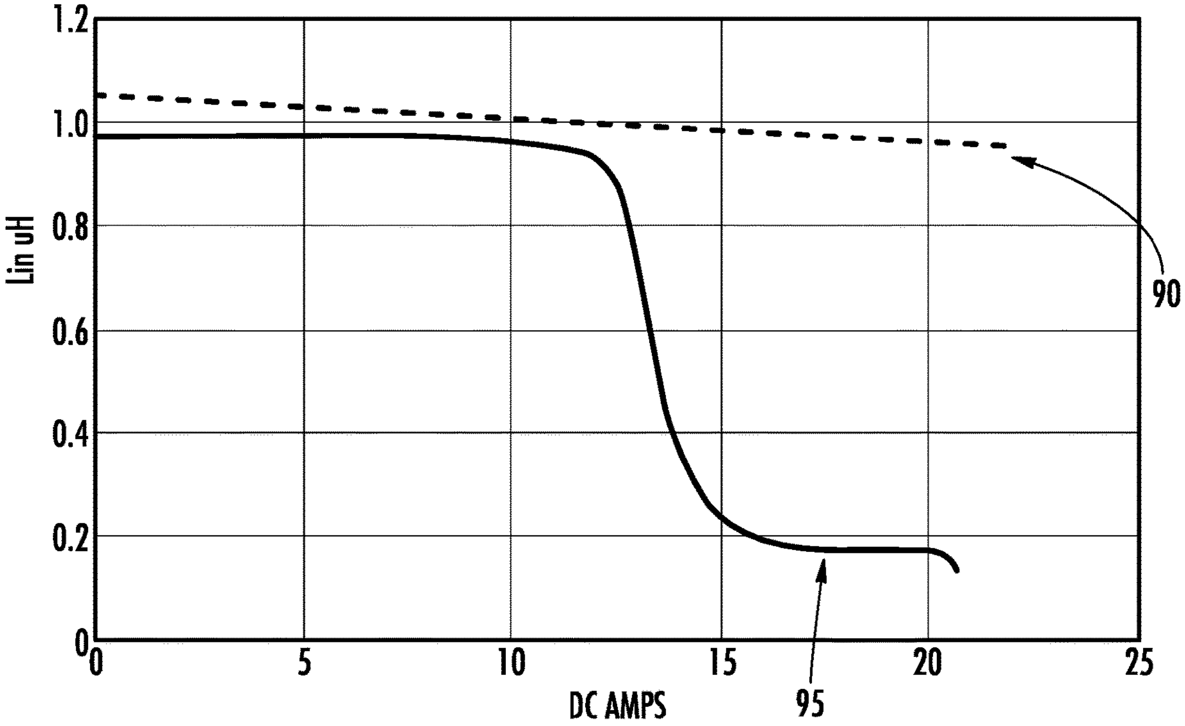
FIG. 9 illustrates a linear saturation curve for a transformer using pressed powder technology as compared to a transformer using ferrite technology.

FIG. 9 illustrates a near linear saturation curve for a transformer using pressed powder technology for forming the soft magnetic composite as compared to a transformer using ferrite technology. The pressed powder technology provides for a near linear saturation curve, shown in FIG. 9. The pressed powder curve 90 while rolling down below an inductance of 1 μH still remains over 0.9 μH at higher currents. On the other hand, the ferrite curve is a stepped or hard saturation curve. The ferrite curve 95 does not rise over 1 μH at any current, and has a steep rolloff between 12-15 A. At higher currents, the ferrite achieves less than 0.2 μH. The pressed powder curve allows higher current density in a smaller package with the ability to handle current spikes without a drastic drop in inductance. This improves the performance and stability of the circuit.

Figure 10:
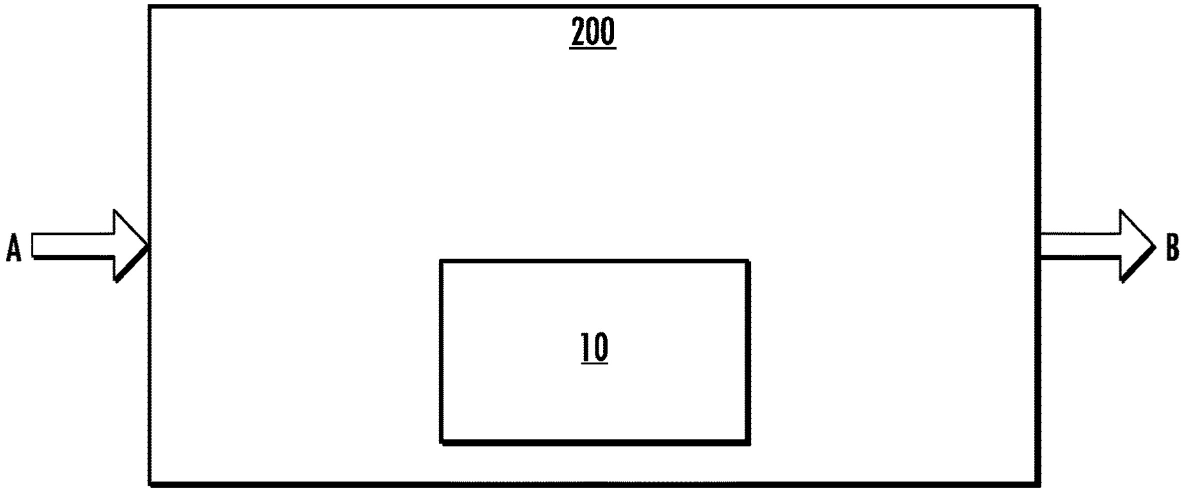
FIG. 10 illustrates a block diagram of a converter using embodiments of the transformer described above.

Referring now to FIG. 10, there is shown a block diagram of a converter utilizing transformer 10. Converter 200 may have an input A and one or more outputs B. In converter 200, the voltage level of input A may be greater than, less than, or equal to the voltage level of output B.

When operating as a SEPIC, for example, converter 200 is a type of DC-to-DC converter that allows the electrical input voltage to be greater than, equal to, or less than the output voltage, and the output voltage has the same polarity as the input voltage. The output of converter 200 is controlled by the duty cycle of the control transistor as described hereinafter. Converter 200 is useful where the battery voltage can be above or below that of the intended output voltage. For example, converter 200 may be useful when a 13.2 volt battery discharges 6 volts (at the converter 200 input), and the system components require 12 volts (at the converter 200 output). In such an example, the input voltage is both above and below the output voltage.

When operating as a Cuk converter, for example, converter 200 is a type of DC-to-DC converter that allows the electrical output voltage to be greater than, equal to, or less than the input voltage, and has the opposite polarity as the input voltage.

Figure 11:
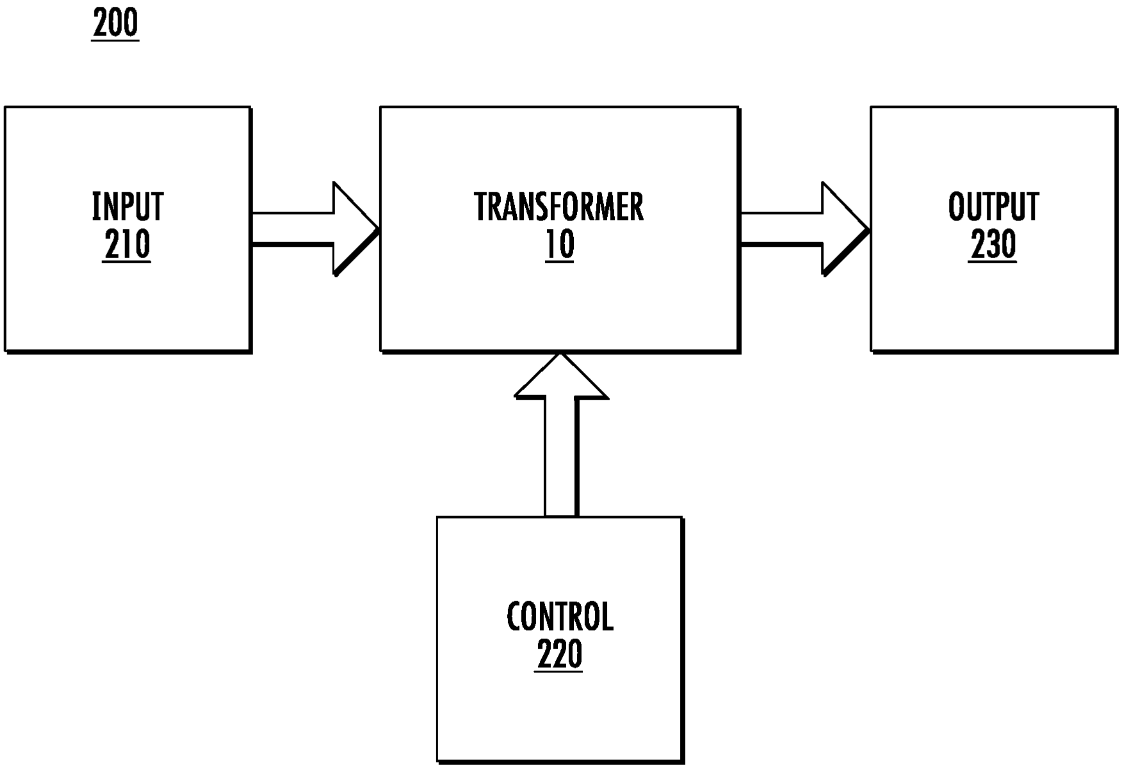
FIG. 11 illustrates a block functional diagram of a converter using the transformer.

FIG. 11 illustrates a block functional diagram of a converter. Converter 200 includes an input 210, an output 230, a transformer 10 and a control unit 220. Converter 200 may also include a feedback loop (not shown) from the output 230 to control unit 220. Input 210 may optionally include voltage regulation and conditioning as desired. Input 210 may include input capacitor(s) to regulate the input voltage. Input 210, after conditioning or regulating the input voltage as desired, provides a signal to transformer 10. Transformer 10 may charge based on the provided signal. For example, a first side of transformer 10 may charge to the value of the input voltage. Based on control 220, this charge in transformer 10 is then delivered to output 230. Output 230 may optionally include conditioning and regulation of an output voltage as desired to provide a more usable voltage from converter 200.

Figure 12:
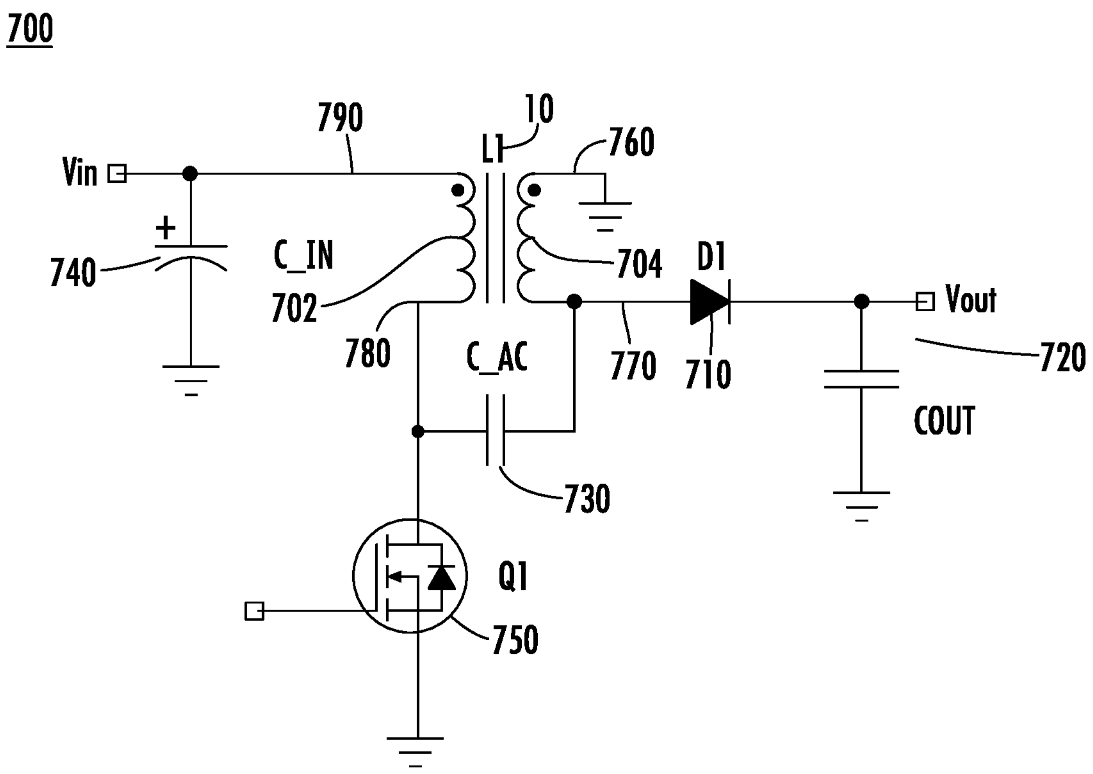
FIG. 12 illustrates an effective circuit diagram for the use of a converter using the transformer and operating as a SEPIC.

Referring now additionally to FIG. 12, an effective circuit diagram for the use of transformer 10 as a SEPIC is shown. SEPICs generally provide a positive regulated output voltage regardless of whether the input voltage is above or below the output voltage. SEPICs are particularly useful in applications that require voltage conversion from an unregulated power supply. SEPIC 700 may include transformer 10 having two windings 702, 704. Each winding may be supplied the same voltage during the switching cycle. Leakage inductance between the two windings may improve the efficiency of SEPIC 700 by lowering AC loss. As illustrated in FIG. 12, transformer 10 has a first lead 760 coupled to ground. A second lead 770 is interconnected with a diode 710 which is coupled to Vout and capacitor 720. In addition, second lead 770 and a third lead 780 are interconnected via capacitor 730 with third lead 780 connected to the drain of transistor 750. A fourth lead 790 of transformer 10 is coupled to Vin and capacitor 740. The source of transistor 750 may be coupled to ground.

The effective inductance of the two windings of transformer 10 wired in series is shown in Equation 2.

$$L=L_1+L_2\pm 2*K*(L_1*L_2)^{0.5} \quad \text{(Equation 2)}$$

The + or − depends on whether the coupling is cumulative or differential. $L_1$ and $L_2$ represent the inductance of the first and second windings and K is the coefficient of coupling. Therefore, transformer 10 may provide 4 L inductance if the inductance of the first and second winding are both L and the coupling was perfect and cumulative.

In analyzing the circuit of FIG. 12, Vin is conditioned by capacitor 740. The first winding 702 of transformer 10 charges and may eventually be equal to Vin. Depending on the control transistor 750, the charge of the first winding may be propagated through circuit 700 to Vout. That is, the charge of first winding of transformer 10 may be conveyed to the second winding of transformer 10. This charge is then coupled to Vout, based on control transistor 750. Capacitor 720 may condition the output voltage from the charge of the second winding of transformer 10. Diode 710 may prevent leakage from capacitor 720 into the remainder of circuit 700.

Figure 13:
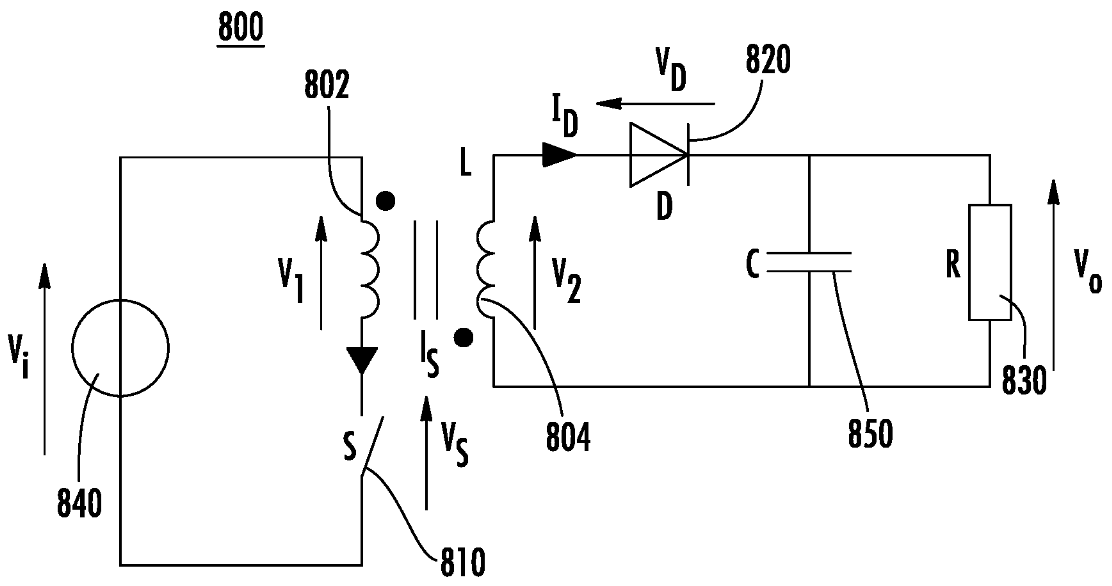
FIG. 13 illustrates an effective circuit diagram for the use of a converter using the transformer and operating as a flyback converter.

FIG. 13 illustrates an effective circuit diagram for the use of a converter using the transformer and operating as a flyback converter. A flyback converter may be used in either AC/DC (requiring rectification) or DC/DC conversion. A flyback converter is a buck-boost converter with a transformer providing isolation.

In FIG. 13, circuit 800 includes an input voltage source 840 electrically coupled to a switch 810 and the primary winding 802 of the transformer. The secondary winding 804 of the transformer is electrically connected to a diode 820 with a capacitor 850 and load 830 coupled in parallel. In operation, when switch 810 is closed, the primary winding 802 is connected to the input voltage source 840. The flux in the transformer increases, storing energy in the transformer. The voltage induced in the secondary winding 804 causes the diode to be reversed biased, and the capacitor 850 supplies energy to the load 830.

When switch 810 is open, the secondary voltage causes the diode 820 to be forward biased. The energy from the transformer recharges the capacitor 850 and supplies the load 830.

Figure 14:
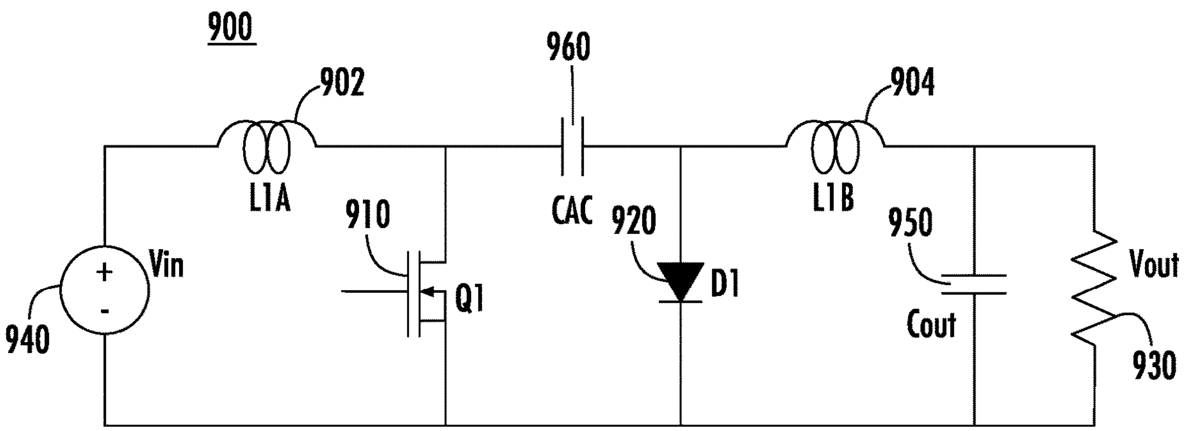
FIG. 14 illustrates an effective circuit diagram for the use of a converter using the transformer and operating as a Cuk converter.

FIG. 14 illustrates an effective circuit diagram for the use of a converter using the transformer and operating as a Cuk converter. A Cuk converter is a DC/DC converter where the output voltage is greater or less than the input voltage while having opposite polarity between input and output voltages.

In FIG. 14 circuit 900 includes an input voltage source 940 electrically coupled to a switch 910 and the primary winding 902 of the transformer. The secondary winding 904 of the transformer is electrically connected to a diode 920, capacitor 950, and load 930 coupled in parallel. In operation, when the switch 910 is open, capacitor 960 may be charged by the input source 940 through the first winding 902. Current flows to the load 930 from the secondary winding 904 through diode 920. When the switch 910 is closed, capacitor 960 and second winding 904 transfer energy to the load 930 through switch 910.

Although the features and elements of the present invention are described in the example embodiments in particular combinations, each feature may be used alone without the other features and elements of the example embodiments or in various combinations with or without other features and elements of the present invention.

What is claimed is:

1. A method of forming an electromagnetic device comprising:

forming a first conductive winding, the first conductive winding comprising a first plurality of winding turns, the first plurality of winding turns having a first end and a second end;

forming a second conductive winding that is not continuous with the first conductive winding comprising a second plurality of winding turns, the second plurality of winding turns having a first end and a second end, wherein no ends of the first conductive winding or the second conductive winding are directly connected to each other, and wherein at least a portion of the first plurality of winding turns is received within a hollow core around which the second plurality of winding turns is wound;

forming a first lead;

connecting the first end of the first plurality of winding turns to the first lead;

forming a second lead;

connecting the second end of the first plurality of winding turns to the second lead;

forming a third lead;

connecting the first end of the second plurality of winding turns to the third lead;

forming a fourth lead;

connecting the second end of the second plurality of winding turns to the fourth lead; and pressure molding a soft magnetic composite to surround at least portions of the first and second plurality of winding turns to form a single unitized body, the soft magnetic composite comprising insulated magnetic particles, the soft magnetic composite tightly pressed around at least portions of the first and second plurality of winding turns, the soft magnetic composite leaving exposed portions of the first, second, third, and fourth leads.

2. The method of claim 1, further comprising extending at least portions of the exposed portions of the first, second, third, and fourth leads along at least a portion of a bottom surface of the body.

3. The method of claim 1, wherein the first plurality of winding turns is wound around a first hollow core, wherein the hollow core around which the second plurality of winding turns is wound comprises a second hollow core, and wherein the soft magnetic composite fills at least a portion of the first hollow core and the second hollow core.

4. The method of claim 1, wherein the soft magnetic composite forms an outermost surface of the electromagnetic device.

5. The method of claim 1, wherein the first plurality of winding turns is wound in a first direction, and the second plurality of winding turns is wound in a second direction, and wherein the first direction and second direction are different directions.

6. The method of claim 1, wherein at least a portion of the first plurality of winding turns and at least a portion of the second plurality of winding turns are in contact.

7. The method of claim 1, wherein the step of pressure molding the soft magnetic composite comprises applying a force of approximately 15 tons per square inch to approximately 60 tons per square inch.

8. The method of claim 1, wherein at least a portion of the first end or at least a portion of the second end of the first plurality of winding turns passes below a lower surface of the e second plurality of winding turns.

9. The method of claim 1, wherein the soft magnetic composite comprises a combination of powders.

10. A method of manufacturing an electromagnetic device comprising:

forming a first conductive winding comprising a first plurality of winding turns;

forming a second conductive winding that is not continuous with the first conductive winding comprising a second plurality of winding turns, wherein no ends of the first conductive winding or the second conductive winding are directly connected to each other, and wherein at least a portion of the first plurality of winding turns is received within a hollow core around which the second plurality of winding turns is wound;

connecting the first conductive winding to a first lead and a second lead;

connecting the second conductive winding to a third lead and a fourth lead; and pressure molding a soft magnetic composite to tightly surround the first plurality of winding turns and second plurality of winding turns to form a single unitized body, the soft magnetic composite leaving exposed portions of the leads.

11. The method of claim 10, further comprising extending at least portions of the exposed portions of the first, second, third, and fourth leads along at least a portion of a bottom surface of the body.

12. The method of claim 10, further comprising extending at least portions of the exposed portions of the leads along at least a portion of a bottom surface of the body.

13. The method of claim 10, wherein the soft magnetic composite forms an outermost surface of the electromagnetic device.

14. The method of claim 10, wherein the first plurality of winding turns is wound in a first direction, and the second plurality of winding turns is wound in a second direction, and the first direction and second direction are different directions.

15. The method of claim 10, wherein at least a portion of the first plurality of winding turns and at least a portion of the second plurality of winding turns are in contact.

16. The method of claim 10, wherein the step of pressure molding a soft magnetic composite comprises applying a force of approximately 15 tons per square inch to approximately 60 tons per square inch.

17. The method of claim 10, wherein at least a portion of the first plurality of winding turns passes below a lower surface of the second plurality of winding turns.

18. The method of claim 10, wherein the soft magnetic composite comprises a combination of powders.

* * * * *